US011946216B2

(12) United States Patent
Cotrell

(10) Patent No.: US 11,946,216 B2
(45) Date of Patent: *Apr. 2, 2024

(54) ADDITIVE MANUFACTURING OF SUPPORT STRUCTURES

(71) Applicant: RCAM Technologies, Inc., Boulder, CO (US)

(72) Inventor: Jason Rust Cotrell, Boulder, CO (US)

(73) Assignee: RCAM Technologies, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/214,510

(22) Filed: Mar. 26, 2021

(65) Prior Publication Data

US 2021/0214913 A1 Jul. 15, 2021

Related U.S. Application Data

(63) Continuation of application No. 16/554,313, filed on Aug. 28, 2019, now Pat. No. 10,988,909.
(Continued)

(51) Int. Cl.
*E02D 27/32* (2006.01)
*E02D 27/02* (2006.01)
(Continued)

(52) U.S. Cl.
CPC ........... *E02D 27/425* (2013.01); *E02D 27/02* (2013.01); *E02D 27/04* (2013.01); *E02D 27/52* (2013.01);
(Continued)

(58) Field of Classification Search
CPC ....... E02D 27/425; E02D 27/02; E02D 27/07; E02D 27/52; E02D 2200/1621;
(Continued)

(56) References Cited

U.S. PATENT DOCUMENTS 3,411,473 A 11/1968 Mott et al.
3,496,900 A 2/1970 Mott et al.
(Continued)

FOREIGN PATENT DOCUMENTS

EP 2735674 5/2014
JP 02243813 9/1990
(Continued)

OTHER PUBLICATIONS

US 11,293,160 B2, 04/2022, Cotrell (withdrawn)
(Continued)

*Primary Examiner* — Benjamin F Fiorello
(74) *Attorney, Agent, or Firm* — Henry Patent Law Firm PLLC

(57) ABSTRACT

In a general aspect, a method is presented for manufacturing support structures for offshore wind turbines. In some implementations, the method includes constructing a plurality of modular sections that assemble to define the support structure. One or more of the plurality of modular sections are configured to anchor to an underwater floor. At least one of the plurality of modular sections is constructed by operations that include forming a wall along a perimeter to bound a volume, filling the volume with a castable material, and hardening the castable material. In some instances, forming the wall includes depositing layers of printable material successively on top of each other. The method also includes joining the plurality of modular sections to assemble the support structure.

14 Claims, 7 Drawing Sheets

Related U.S. Application Data

(60) Provisional application No. 62/804,952, filed on Feb. 13, 2019, provisional application No. 62/724,445, filed on Aug. 29, 2018.

(51) Int. Cl.
   *E02D 27/04*   (2006.01)
   *E02D 27/42*   (2006.01)
   *E02D 27/52*   (2006.01)
   *F03D 13/20*   (2016.01)
   *F03D 13/25*   (2016.01)

(52) U.S. Cl.
   CPC .............. *F03D 13/22* (2016.05); *F03D 13/25* (2016.05); *E02D 2200/1621* (2013.01); *E02D 2250/0061* (2013.01); *F05B 2230/21* (2013.01); *F05B 2230/31* (2013.01); *F05B 2240/95* (2013.01)

(58) Field of Classification Search
   CPC . E02D 2250/0061; F03D 13/22; F03D 13/25; F05B 2230/21; F05B 2230/31
   See application file for complete search history.

(56) References Cited

U.S. PATENT DOCUMENTS

| | | | |
|---|---|---|---|
| 4,733,993 | A | 3/1988 | Andreasson |
| 6,782,667 | B2 * | 8/2004 | Henderson .............. E04H 12/34 52/118 |
| 8,215,873 | B1 | 7/2012 | Lugo et al. |
| 8,425,153 | B1 | 4/2013 | South |
| 8,698,338 | B2 | 4/2014 | Slocum et al. |
| 9,534,405 | B1 | 1/2017 | Phuly |
| 9,850,658 | B2 | 12/2017 | Alcala Ordaz |
| 9,938,685 | B2 | 4/2018 | Krause |
| 2003/0033781 | A1 | 2/2003 | Schmidt |
| 2006/0127187 | A1 | 6/2006 | Raines |
| 2008/0040983 | A1 | 2/2008 | Fernandez Gomez et al. |
| 2008/0072511 | A1 | 3/2008 | Phuly |
| 2010/0318222 | A1 | 12/2010 | Khoshnevis |
| 2011/0215650 | A1 | 9/2011 | Slocum et al. |
| 2012/0047830 | A1 | 3/2012 | Phuly |
| 2013/0175804 | A1 * | 7/2013 | Cironi ....................... F03D 9/11 290/55 |
| 2014/0033628 | A1 | 2/2014 | Lockwood et al. |
| 2014/0284830 | A1 | 9/2014 | Fromm |
| 2014/0348662 | A1 | 11/2014 | Schibsbye |
| 2015/0300036 | A1 | 10/2015 | Khoshnevis |
| 2016/0258421 | A1 | 9/2016 | Agassi |
| 2016/0376763 | A1 | 12/2016 | Phuly |
| 2017/0016244 | A1 | 1/2017 | Keller et al. |
| 2017/0089090 | A1 | 3/2017 | Diez Cornejo |
| 2017/0183840 | A1 | 6/2017 | Tozer |
| 2017/0218923 | A1 | 8/2017 | Baba et al. |
| 2018/0170488 | A1 | 6/2018 | Fernandez Gomez et al. |
| 2018/0245402 | A1 | 8/2018 | Lockwood et al. |
| 2018/0258604 | A1 | 9/2018 | Coordes et al. |
| 2019/0119875 | A1 | 4/2019 | Corella et al. |
| 2022/0063769 | A1 | 3/2022 | Cotrell et al. |

FOREIGN PATENT DOCUMENTS

| | | |
|---|---|---|
| JP | 10175589 | 6/1998 |
| JP | 2002047664 | 2/2002 |
| JP | 2015034430 | 2/2015 |
| JP | 2015186851 | 10/2015 |
| KR | 20130094410 | 8/2013 |
| WO | 2017148961 | 9/2017 |
| WO | 2020176262 | 9/2020 |

OTHER PUBLICATIONS

Nadarajah, Nithesh; "Development of concrete 3D printing" Aug. 27, 2018; all (Year: 2018).*

ForConstructionPros; "How 3D Printing is Affecting the Construction Industry"; Apr. 16, 2015; all (Year: 2015).*

KIPO, International Search Report and Written Opinion dated Oct. 27, 2020, in PCT/US2020/017973, 10 pgs.

"Fast Custom Concrete", Big Rep, Jun. 2017, 5 pgs.

"New suction pile concept for offshore wind turbines", SPT Offshore, downloaded Nov. 14, 2019, from https://www.4coffshore.com/news/new-suction-pile-concept-for-offshore . . . , Oct. 30, 2017, 2 pgs.

"Tri-Suction Pile Caisson (TSPC)", SPT Offshore; downloaded Nov. 14, 2019, from https://www.sptoffshore.com/solutions1/suction-piles-for-wind-turbines/tri-suction-pile-caisson-tspc/, 3 pgs.

Cathie , et al., "Suction Installed Caisson Foundations for Offshore Wind: Design Guidelines", Offshore Wind Accelerator; Issue 1.0, Feb. 2019, 103 pgs.

USPTO, Non-Final Office Action dated Sep. 28, 2021, in U.S. Appl. No. 17/214,451, 20 pgs.

USPTO, Non-Final Office Action dated Sep. 7, 2021, in U.S. Appl. No. 17/214,433, 17 pgs.

Benveniste , et al., "Qualification of innovative floating substructures for 10MW wind turbines and water depths greater than 50m", downloaded Jun. 21, 2020, from https://lifes50plus.eu/wp-content/uploads/2016/10/GA_640741_D2.2-internal.pdf, 2016, 103 pgs.

EPO, Extended European Search Report dated Mar. 10, 2022, in EP 20763934.5, 8.

EPO, Communication pursuant to Article 94(3) issued in Application No. 20763934.5 dated Jun. 30, 2023, 6 pages.

JPO, Office Action issued in Application No. 2021-547583 dated Feb. 8, 2024, 14 pages.

* cited by examiner

ADDITIVE MANUFACTURING OF SUPPORT STRUCTURES

CROSS-REFERENCE TO RELATED APPLICATIONS

This application is a continuation of U.S. patent application Ser. No. 16/554,313, filed Aug. 28, 2019, which claims priority to U.S. Provisional Application No. 62/724,445, filed Aug. 29, 2018 and entitled "Systems and Methods for Additive Manufacturing of Large Structures," and U.S. Provisional Application No. 62/804,952, filed Feb. 13, 2019 and entitled "Systems and Methods for Manufacturing, Assembling, Transporting, and Installing Large Structures." The priority applications are hereby incorporated by reference in their entirety.

BACKGROUND

The following description relates to additive manufacturing of support structures.

Structures are often used to support objects such as bridges, overpasses, elevated platforms, energy-generating devices (e.g., wind turbines), and so forth. These support structures typically include sections such as foundations, towers, pillars, and so forth. However, the support structures and their sections are often large and difficult to transport over land (e.g., via roads or rail) or bodies of water (e.g., carried by marine vehicles). Moreover, the large size of the support structures and sections increases their time-to-manufacture, thereby increasing cost Methods of manufacturing that improve transportation, reduce time-to-manufacture, and lower the fabrication costs of support structures are desirable.

DETAILED DESCRIPTION

Figure 1A:
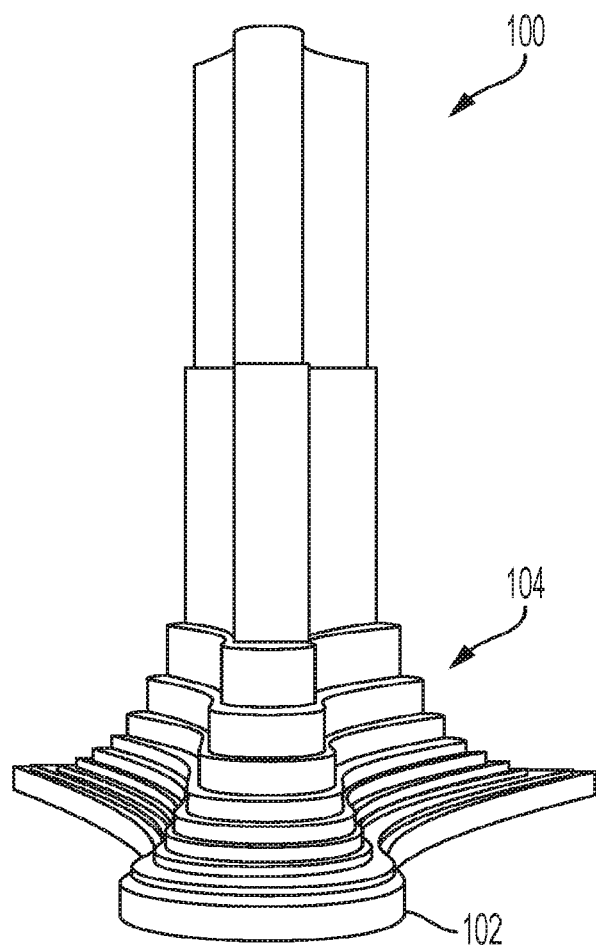
FIG. 1A is an example support structure fabricated using 3D-casting methods.

Many structures for supporting energy-generating devices, such as offshore wind turbines, land-based wind turbines, and wave energy converters, include towers that are disposed on a foundation. However, these support structures are too large to transport due to their extremely large dimensions (e.g., transport over roads, rail, through tunnels, etc.). Moreover, on-site manufacturing methods, such those that incorporate weldments and traditional concrete fabrication, are costly and slow for the large production volumes needed to produce such support structures. The additive manufacturing methods described herein can provide advantages over conventional on-site manufacturing methods in producing support structures for energy-generating devices. For example, the additive manufacturing methods presented herein may increase production rates, reduce transportation costs, and/or reduce the capital costs of tall towers and large foundations associated with energy-generating devices. The additive manufacturing methods may also be application to other types of support structures (and structures in general).

Conventional support structures for energy-generating devices (e.g., for offshore wind turbines, land-based wind turbines, wave-powered generators, etc.) are typically made from rolled steel cylindrical sections. These cylindrical sections become progressively expensive to transport if configured for larger (or taller) energy-generating devices. Road and rail pathways often have weight and size limits, some of which, are further constrained by bridges, tunnels, and overhead signals. For example, the maximum diameter of a tower for a land-based wind turbine that can be transported over land is less than 4.6 m in most U.S. regions. However, the optimal diameter of a 160-meter tall tower made from rolled steel is about 8 meters. Offshore towers, substructures (i.e., the tower portion below the water surface), and foundations for offshore wind and wave energy converters are even larger in size than towers, necessitating on-site or near-site construction methods. For example, manufacturing of a conventional steel jacket substructure and foundation used for offshore structures is slow and expensive. A 1,500-ton jacket substructure and tower for an offshore wind turbine may cost upwards of approximately $5 million.

In some aspects of what is described here, systems and methods are disclosed that additively manufacture support structures. The support structures include towers, substructures, and corresponding foundation configurations, and may be configured to support energy-generating devices, such as land-based wind turbines, offshore wind turbines, wave-powered generators, and so forth. However, in some variations, the support structures are configured to support other bodies, such as bridges, overpasses, and so forth. The systems and methods may employ additive materials that are less expensive than conventional materials. For example, the additive manufacturing systems and methods may reduce the capital cost of an offshore substructure and tower by up to 80% relative to conventionally-manufactured structures. The additive manufacturing systems and methods may also utilize low-cost, regionally-sourced cementitious or ceramic materials, and in some instances, do so without expensive temporary formwork. The additive manufacturing systems and methods may increase production speed using automated processes or systems.

In some examples, the systems and methods use additive manufacturing (AM) to manufacturing a tower, a substructure, a foundation, or any combination thereof, for energy-generating devices. The additive manufacturing may occur at or near the location where the energy-generating devices are installed. Such additive manufacturing may be called, respectively, on-site and near-site manufacturing. In the case of water-powered generators and offshore-wind turbine installations, additive manufacturing can be used for on-site at or near-site construction near the dock or port where the turbines and foundations are staged before being transported to an offshore installation site. By using additive manufacturing methods to fabricate structures and foundations on-site or near-site, transportation may become easier and cheaper than if fabricated at a location farther away, such as an in-land factory. For instance, instead of transporting over-sized wind turbine tower sections and concrete for a foundation, contractors or other construction personnel can transport a mobile additive manufacturing system—along with a relatively smaller amount of additive manufacturing material—to or near the manufacturing or installation site. For larger wind plant installations, existing material production infrastructure (e.g., concrete batch plants used for foundations) may be used to produce material for the additive manufacturing system. In this way, the systems and methods described herein may reduce the cost of transporting over-sized structures over roads or rail lines, and reduce the time and cost required to construct the structures.

Additive manufacturing, sometimes referred to as "3D printing," creates parts or sections using a layered deposition process to form a three-dimensional (3D) structure by adding layers-upon-layers of materials. The parts or sections may be modular, and as such, correspond to discrete portions of the three-dimensional (3D) structure that are configured to interface with each other. In certain instances, this modularity may allow one or more parts or sections to be interchangeable with others in the three-dimensional structure. In certain instances, the modularity may allow one or more of the parts or sections to share a set of dimensions in common, thereby defining a common shape or motif. Additive manufacturing using cementitious or ceramic materials, sometimes called 3D Construction Printing (3DCP), can be used for large structures, such as a tower, a substructure, and a foundation for wind turbines or water-powered generators.

Figure 1B:
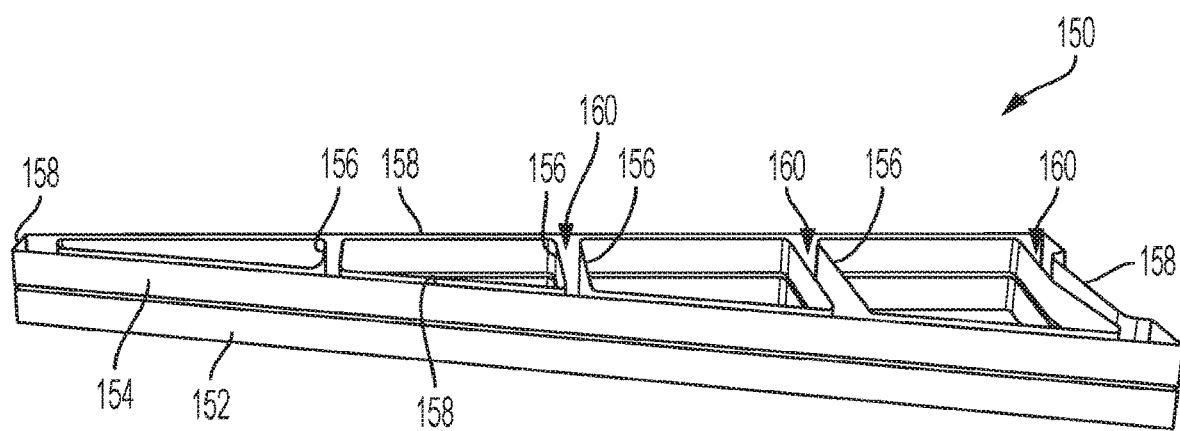
FIG. 1B is an example support structure fabricated using 3D-casting methods.

As shown in FIGS. 1A & 1B, a fast method of 3DCP, referred to here as "3D-casting", uses additive manufacturing to directly 3D-print modular sections to define, respectively, support structures 100, 150. Outer and inner walls (e.g., outer walls 158 and inner walls 156 in FIG. 1B) are formed up to several meters high or taller without a temporary formwork. Such formation may occur using a printable material. After a period of hardening, a castable material (e.g., a concrete or other cementitious material) is poured or "cast" in a volume (e.g., volume 160 of FIG. 1B) between the outer and inner walls and allowed to harden, thereby constructing a first modular section 102, 152. If desired, reinforcement elements such as steel rebar or fibrous mesh can be deposited between the outer and inner walls before adding the castable material to provide additional strengthening of the modular section. Fibrous reinforcement elements can also be mixed into the printable materials or castable materials before being processed to form the modular sections. After sufficient hardening of the cast and 3D printed materials, the walls of second modular sections 104, 154 can then be deposited on top of the first modular sections 102, 152 to increase the height of the support structure. Volumes bounded by the walls of the second modular sections 104, 154 may then be filled with castable material, which subsequently allowed to harden. In this manner, the 3D-casting operations may be successively repeated to manufacture additional modular sections, resulting in tall support structures 100, 150 that may reach tens or hundreds of meters high.

In some implementations, a method of manufacturing a support structure includes constructing a plurality of modular sections that assemble to define the support structure. The support structure may be configured to support an energy-generating device (e.g., a wind turbine) or some other type of body (e.g., a bridge, an overpass, etc.). At least one of the plurality of modular sections is constructed by operations that include forming a wall along a perimeter to bound a volume, filling the volume with a castable material, and hardening the castable material. The operations may correspond to a 3DCP casting process. The method also includes joining the plurality of modular sections to assemble the support structure. The support structure may include one or more modular sections configured to couple to another body or surface. For example, if the support structure is adapted for offshore wind turbines, the one or more modular sections may be configured to anchor to an underwater floor (e.g., a seabed, a lake bed, a river bed, etc.). Similarly, if the support structure is adapted for land-based wind turbines, the one or more modular sections may be configured to anchor to ground (e.g., underground bedrock, a pre-cast cement slab, etc.). Other types of bodies or surfaces are possible (e.g., bridges, overpasses, etc.) as well as other types of deployment locations (e.g., on a pre-fabricated structure, suspended in air, etc.). In some implementations, the operation of forming the wall includes depositing layers of printable material successively on top of each other. In further implementations, the operation of forming the wall also includes hardening the layers of printable material.

As used herein, the term "castable material" refers to a material having a rheology adapted for pouring or dispensing into a containing body or mold. The "castable material" is capable of hardening or solidifying, such as after a period of time or in response to heating, cooling, or exposure to radiation (e.g., ultraviolet light). For example, the "castable material" may be a cementitious material (e.g., a "Portland" cement) that, in some instances, may include aggregate or rock disposed therein. Other types of "castable materials" are possible. In some implementations, the "castable material" includes reinforcing elements, such as rebar, mesh, fibers, fine aggregate (e.g., sand), coarse aggregate, polymers, chemical additives, ceramic materials, geopolymer materials, engineered cementitious composites and so forth.

As used herein, the term "printable material" refers to a material having a rheology adapted for dispensing through an orifice or nozzle (e.g., via extrusion, spray, etc.). Such dispensing may occur in response to a force or pressure applied to the material, thereby allowing the material to form a three-dimensional body after being dispensed in successive, contacting portions. The "printable material" is also capable of hardening or solidifying, such as after a period of time or in response to heating, cooling, or radiation. For example, the "printable material" may include a cementitious material (e.g., a "Portland" cement) that, in some instances, includes aggregate or rock disposed therein. In another example, the "printable material" includes sand, rock, fibers, water, chemical additives, engineered cementitious composites, or gravel interspersed within an organic resin, epoxy, or plastic. Other types of printable materials are possible. In some implementations, the "printable material" includes reinforcing elements, such as rebar, mesh, fibers, mesh, mini-bars, aggregate, cables, wires, strands, and so forth.

In some implementations, the plurality of modular sections includes a first modular section and a second modular section. The second modular section is constructed after the first modular section and serves as part of the at least one modular section constructed by the operations. In these implementations, joining the plurality of modular sections includes forming the wall of the second modular section on a surface of the first modular section. The wall of the second modular section and the surface of the first modular section bound the volume associated with the second modular section. Joining the plurality of modular sections also includes filling the volume of the section modular section with a castable material. The castable material contacts the surface of the first modular section when the volume associated with the second modular section is filled. In some variations, the first modular section may be part of the at least one modular section and also constructed by the operations. However, in other variations, the first modular section is formed through other types of operations (e.g., a conventional construction process). In some instances, the first and second modular sections are identical in shape and size. In some instances, the first and second modular sections are similar in shape but different in size (e.g., scaled). In some instances, the first and second modular sections are different in shape and size.

The operations for constructing the at least one modular section may include an inner wall, and outer wall, or both. Other types of walls or mechanical elements (e.g., trusses) may also be manufactured into the at least one modular section. For example, the wall of the at least one modular section may be an inner wall and the perimeter may be an inner perimeter. The operations may include disposing a removable wall (e.g., a temporary formwork) along an outer perimeter that contains the inner perimeter. The volume is then bounded by the inner and removable walls. The removable wall is removed after hardening the castable material. In another example, the wall of the at least one modular section may be an outer wall and the perimeter may be an outer perimeter. The operations may include forming an inner wall along an inner perimeter contained by the outer perimeter. The volume is then bounded by the inner and outer walls.

In some implementations, the plurality of modular sections includes at least two modular sections configured to selectively join and unjoin from each other. Such capability may allow the support structure to be disassembled after installation, such as for maintenance, repair, and so forth. In further implementations, the method includes unjoining the plurality of modular sections to disassemble the support structure.

The support structure may also be manufactured to include post-tensioning devices. Such devices may prestress part or all of the support structure, providing mechanical advantages such as improved strength. In some implementations, at least one instance of the at least one modular section is constructed as a post-tensioned modular section. For the post-tensioned modular section, the operations may include one or both of disposing a post-tensioned device in the wall of the post-tensioned modular section during formation and disposing a post-tensioning device in the castable material of the post-tensioned modular section. Such disposal may occur in a printable or castable material before hardening (i.e., bonded thereto), through a hole, channel, or guide element in the post-tensioned modular section, or both. Examples of the post-tensioning device include cables, rods, tendons, fasteners, and so forth. In these implementations, joining the plurality of modular sections includes using the disposed post-tensioned devices to join the post-tensioned modular section to one or more other modular sections of the plurality of modular sections.

The support structure may also be manufactured to include structural features. In some implementations, the at least one modular section, when constructed, comprises a cavity that defines at least part of a buoyancy chamber of the support structure. In some implementations, the plurality of modular sections, when assembled, defines a hole or gap configured to guide water or air through the support structure. The hole or gap may be within a single modular section or extend through multiple modular sections. The plurality of modular sections may also include multiple instances of such holes or gaps. The holes or gaps may be operable to reduce a fluidic drag (e.g., to water, air, or both) of the support structure when deployed.

For applications in or over a body of water (e.g., offshore), the support structure may be manufactured to couple to an underwater floor (e.g., a floor of an ocean, sea, lake, river, etc.). In some implementations, the plurality of modular sections includes one or more modular sections configured to anchor to an underwater floor. The one or more modular sections may contact the underwater floor when anchored thereto, or alternatively, tether to a submerged structure in contact with the underwater floor (e.g., when the submerged structure is coupled to and in contact with the underwater floor).

Although FIGS. 1A & 1B depict support structures 100, 150 as extending vertically, the method may produce other types of extensions. For example, joining the plurality of modular sections may include arranging the plurality of modular sections into a stacked assembly in which the plurality of modular sections extends upwards from a bottom-most modular section to a top-most modular section (e.g., vertically). In another example, joining the plurality of modular sections includes arranging the plurality of modular sections into a nested assembly in which the plurality of modular sections extends outwards from an inner-most modular section to an outer-most modular section. In some instances, the nested assembly corresponds to a horizontal extension of the plurality of modular sections. However, other types of nested assemblies are possible.

In some implementations, a method of manufacturing a support structure includes constructing a plurality of modular sections that assemble to define the support structure. The support structure may be configured to support an energy-generating device (e.g., a wind turbine) or some other type of body (e.g., a bridge, an overpass, etc.). The plurality of modular sections includes an unfilled modular section constructed by first operations comprising forming a wall or a truss. The first operations may correspond to a 3DCP process. The plurality of modular sections also includes an optional filled modular section constructed by second operations comprising forming a wall along a perimeter to bound a volume, filling the volume with a castable material, and hardening the castable material. The second operations may correspond to a 3DCP casting process. The method includes joining the plurality of modular sections to assemble the support structure. The support structure may include one or more modular sections configured to couple to another body or surface. For example, if the support structure is adapted for offshore wind turbines, the one or more modular sections may be configured to anchor to an underwater floor (e.g., a seabed, a lake bed, a river bed, etc.). Similarly, if the support structure is adapted for land-based wind turbines, the one or more modular sections may be configured to anchor to ground (e.g., underground bedrock, a pre-cast cement slab, etc.). Other types of bodies or surfaces are possible (e.g., bridges, overpasses, etc.) as well as other types of deployment locations (e.g., on a pre-fabricated structure, suspended in air, etc.). Additional operations and features of the method are described below and in relation to Examples 52-72.

In some implementations, forming the wall or truss, forming the wall along the perimeter, or both, comprise depositing layers of printable material successively on top of each other. In further implementations, forming the wall or truss, forming the wall along the perimeter, or both, comprise hardening the layers of printable material.

In some implementations, the plurality of modular sections includes a first modular section and a second modular section. The second modular section is constructed after the first modular section and corresponds to the unfilled modular section. In these implementations, joining the plurality of modular sections includes forming the wall or the truss (of the unfilled modular section) on a surface of the first modular section. In some variations, the first modular section corresponds to the optional filled modular section. However, in other variations, the first modular section is formed through other types of operations (e.g., a conventional construction process). In some instances, the first and second modular sections are identical in shape and size. In some instances, the first and second modular sections are similar in shape but different in size (e.g., scaled). In some instances, the first and second modular sections are different in shape and size.

In some implementations, the plurality of modular sections includes a first modular section and a second modular section. The second modular section is constructed after the first modular section and corresponds to the optional unfilled modular section. In these implementations, joining the plurality of modular sections includes forming the wall of the second modular section (or optional unfilled modular section) on a surface of the first modular section. The wall of the second modular section and the surface of the first modular section bound the volume associated with the second modular section. Joining the plurality of modular sections also includes filling the volume associated with the second modular section (or optional unfilled modular section) with a castable material. The castable material contacts the surface of the first modular section when the volume associated with the second modular section is filled. In some variations, the first modular section corresponds to the unfilled modular section. However, in other variations, the first modular section is formed through other types of operations (e.g., a conventional construction process). In some instances, the first and second modular sections are identical in shape and size. In some instances, the first and second modular sections are similar in shape but different in size (e.g., scaled). In some instances, the first and second modular sections are different in shape and size.

In some implementations, the first operations associated with the unfilled modular section include disposing a post-tensioning device in the wall, the truss, or both, of the unfilled modular section during formation. Such disposal may occur in a printable material before hardening (i.e., bonded thereto), through a hole, channel, or guide element in the unfilled modular section, or both. Examples of the post-tensioning device include cables, rods, tendons, fasteners, and so forth. Such devices may pre-stress part or all of the support structure, providing mechanical advantages such as improved strength. In these implementations, joining the plurality of modular sections includes using the post-tensioned device to join the unfilled modular section to one or more other modular sections of the plurality of modular sections.

In some implementations, the second operations associated with the optional filled modular section include one or both of disposing a post-tensioning device in the wall of the optional filled modular section during formation, and disposing a post-tensioning device in the castable material of the optional filled modular section. Such disposal may occur in a printable material or the castable material before hardening (i.e., bonded thereto), through a hole, channel, or guide element in the optional filled modular section, or both. In these implementations, joining the plurality of modular sections includes using the disposed post-tensioned devices to join the optional filled modular section to one or more other modular sections of the plurality of modular sections.

Figure 2:
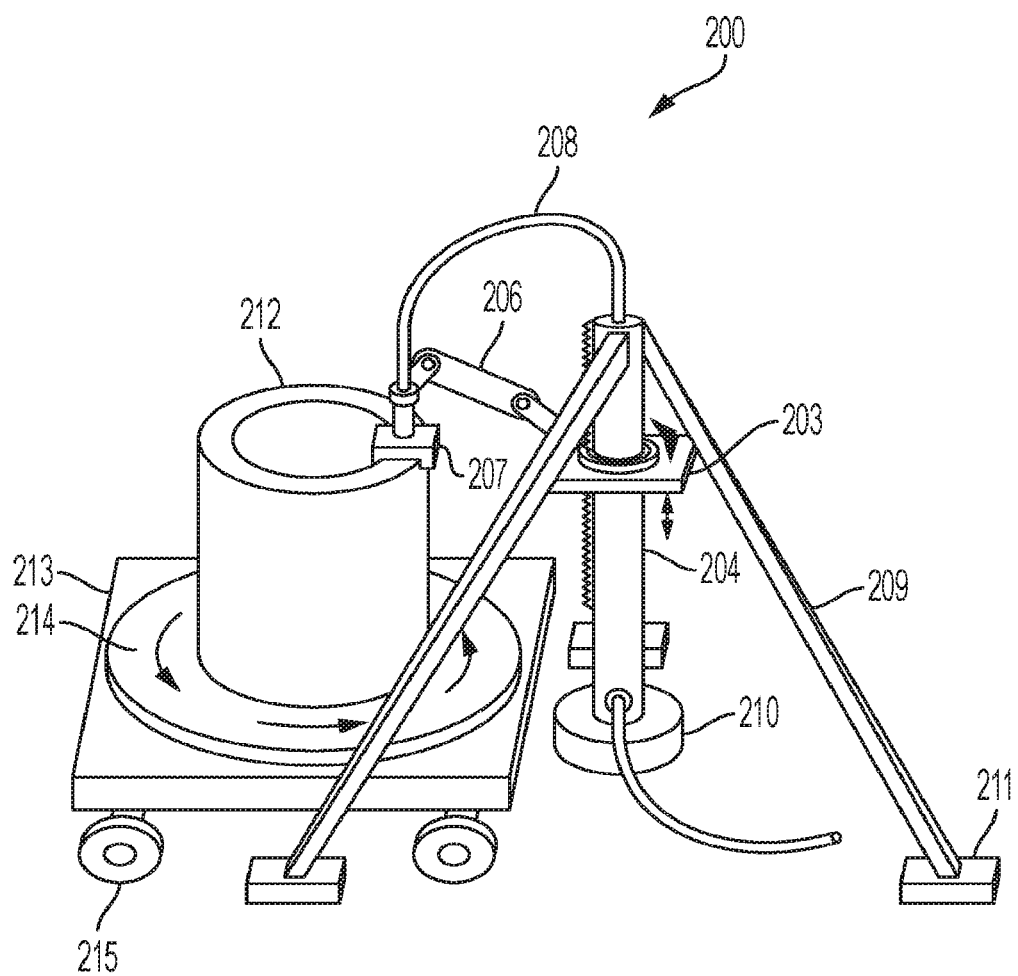
FIG. 2 is an example system for fabricating large structures from additive materials using 3D Concrete Printing or 3D casting.

Now referring to FIG. 2, an example system 200 is presented for fabricating large structures from additive materials using 3DCP or 3D casting. FIG. 2 is not necessarily illustrated to scale. The example system 200 includes a fixed or mobile platform to support and position a tower or foundation body portion for manufacturing. The system 200 also includes a print head positioned by an articulated arm for depositing a printable material, such as cementitious or other materials. The print head may include a means of embedding reinforcement elements into the printable material. The system 200 additionally includes a platform and drive system to adjust the vertical position of the articulated arm in which the print head is configured to output, onto at least one wall, the printable material. In some variations, the print head is positioned using a moveable arm supported by a gantry structure. FIG. 2 depicts the example system 200 as including a platform 203, a guide 204, a drive unit 205, an articulated arm 206, a print head 207, a delivery tube 208, a support arm 209, and feet 210, 211. The example system 200 may include a means of supporting and positioning a manufactured structure 212, which may include a turntable 214, and a cart 213 positioned with tracks or wheels 215. FIG. 2 illustrates only one example of a structure fabrication system. Other structure fabrication systems having more, fewer, or different components may be used in other embodiments.

In some implementations, the example print head 207 is configured to deposit cementitious, ceramic, reinforcement, or other printable materials by extruding them onto the printed surface. The print head 207 may optionally be configured to shape the printable materials as they are deposited. In some implementations, the print heat 207 is configured to spray the printable materials onto a surface, such as with a process commonly called shotcrete for cementitious or ceramic materials. The shotcrete process may allow for faster material deposition, the ability to deposit materials horizontally or from below, and the ability to more fully cover reinforcement materials that are added to the structure manually or in an automated fashion.

In some implementations, the example system 200 may include one or more additional components (e.g., sensors, an arm, etc.) to finish the surfaces of the structure 212. Such finishing may be for aesthetic purposes or to facilitate joining of one or more body portions. During additive manufacturing, the example system 200 may intentionally or unintentionally create uneven surfaces during construction of the structure 212. Thus, the example system 200 may include additional components to smooth out such unevenness. The additional components may be attached to the articulated arm or be added as one or more additional arms.

Figure 3:
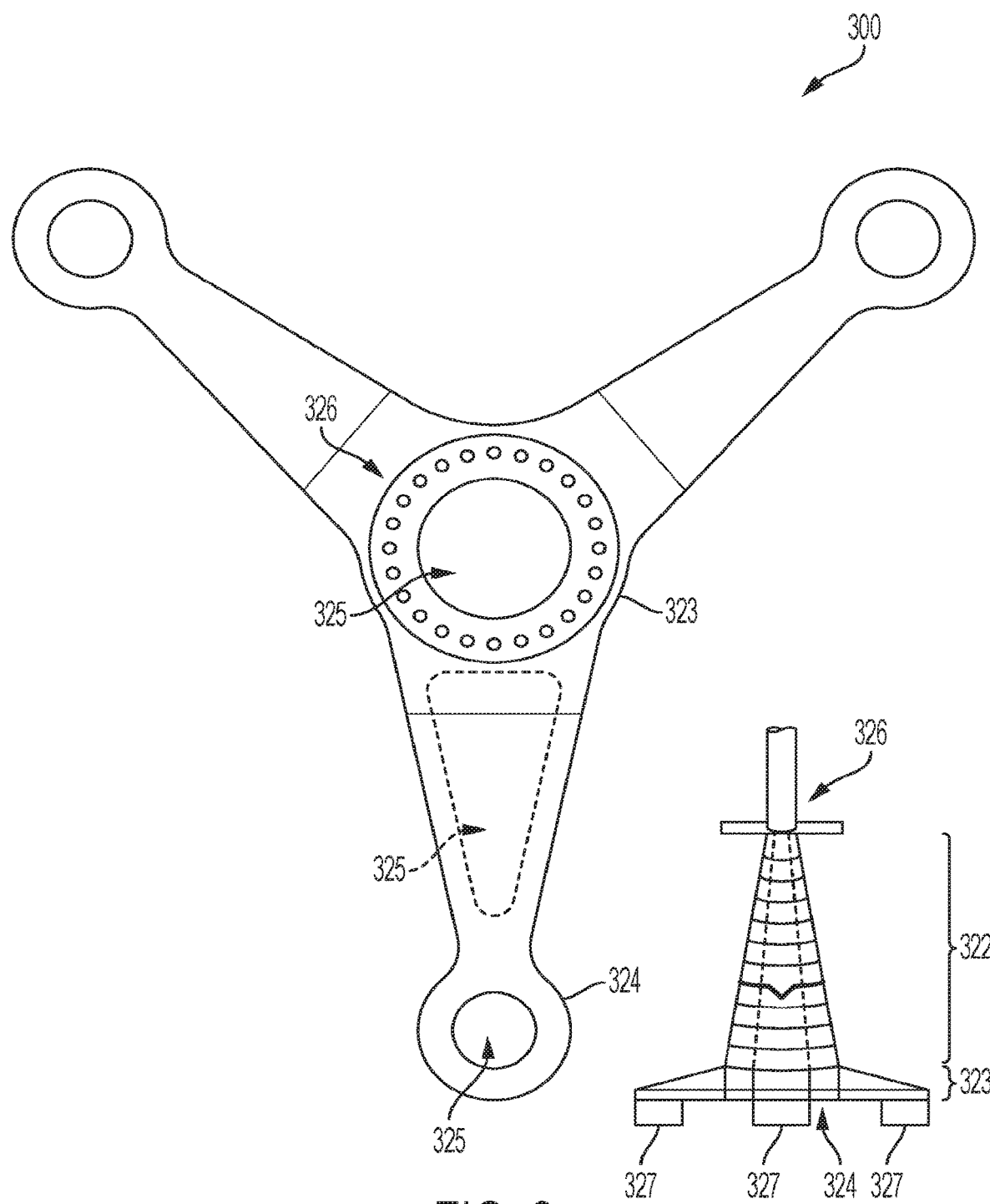
FIG. 3 is an example tower and foundation structure 300 manufactured by 3D Construction Printing.

Now referring to FIG. 3, an example support structure 300, which includes a tower and foundation, are presented that are manufactured by a 3DCP method. The example support structure 300 includes a tower or substructure section 322, a foundation section 323, an anchoring system 324, buoyancy cavities 325, and interfaces 326.

The example support structure 300 may be integrated and built as a single piece or manufactured as two or more separate pieces that are joined together using fasteners, post-tensioning tendons, or the like. Furthermore, in some variations, related sections, such as tower sections made of rolled steel shapes, can be placed and joined directly on top of the tower or substructure section 322 to further extend the tower height, or be placed directly on top of the foundation sections described herein. That is, the sections and/or foundations described herein may be combined with related techniques to produce hybrid support structures. Fasteners or post-tensioning tendons can also be used to further strengthen the additively-manufactured structure by applying compressive stresses to the structure, thereby reducing the amount of tension loads in the concrete. The fasteners or post-tensioning tendons may be part of a method to pre-stress the structure.

The example sections 322, 323 shown in FIG. 3 may be above ground-level for land-based applications (e.g., to support land-based wind turbines), or above an underwater floor for offshore applications (e.g., a sea floor). However, in some variations, the sections 322, 323 may be entirely or partially below ground-level, or the underwater floor in the case of structures deployed in bodies of water. In addition, the sections 322, 323 may optionally extend above the water surface in offshore applications.

FIG. 3 depicts the tower section 322 as generally cylindrical. This cylindrical shape may be continuous or may have one or multiple interfaces 326 with the foundation section 323, other tower sections 322, or a wind or wave energy generating device. In some implementations, the tower or substructure section 322 may be another shape, such as a square, a pyramid, frustum, polygon, or other shape. A wall of tower section 322 may incorporate relatively complex geometries, such as doorway, or structural supports, baffles, conduits, or other customizable geometry.

The foundation section 323 represents a foundation system that interfaces with the ground for land-based installations, and with underwater floors for offshore installations. The foundation section 323 can be manufactured to have no arms or a multitude of arms. In some instances, such as shown in FIG. 3, the foundation section 323 has three arms. The mass of sections 322 and 323 act to prevent the wind turbine system from overturning due to wind or water loads. The foundation section 323 can be further anchored to an underwater floor using optional suction piles 327 (also called suction caissons) inserted through the end of the three arms. Suction piles can effectively be described as an upturned bucket that is embedded in the marine or underwater sediment. Such embedding may be achieved by pushing and/or by creating a negative pressure inside the caisson skirt. Both physical processes assist in securing the suction caisson into the underwater floor. The foundation section 323 can also be rapidly removed by reversing the installation process, e.g., applying pressure inside the caisson skirt with air, water, or other fluids.

The optional suction piles 327 are shown in FIG. 3 (see lower right inset) coupled to respective arms of the anchoring system 324 at their ends. However, in some variations, a suction pile may also be disposed in a central portion of the foundation section 323. In the case of an offshore installation, steel or cementitious suction piles can be fastened to the arms to secure the foundation to the underwater floor, or alternatively, the suction piles can be built as integrated components using, for example, the 3DCP or 3DCP casting process, or other manufacturing processes. A thin knife edge or surface can be added or built into the bottom of a suction pile to facilitate penetration of the underwater floor, especially for thick-walled suction piles.

The amount of additive materials used to fabricate the foundation section 323 can be reduced by incorporating cavities 325 in the structure in areas where stresses in the structure tend to be lower and less material needed. The cavities 325 can also be sealed using covers or with surfaces manufactured as part of the tower section 322 or foundation section 323 using 3DCP, 3DCP-casting, or other manufacturing methods to create buoyancy chambers in the foundation. The buoyancy chambers can be used to create a buoyant force to aid during transportation and installation of the foundation section 323, the tower 322, and, optionally, the energy-generating device attached the tower 322. Alternatively, the cavities 325 can be filled with sand, iron ore, recycled crushed concrete, gravel, stones or other materials to provide additional weight to resist overturning of the structure from wind or wave loads after installation of the structure.

The support structure 300 may reduce cost, have less mass, generate less waste, allow faster production, and include on-site manufacturing when compared to conventional manufacturing methods (e.g., conventional concrete casting of the foundation and tower, or steel weldments). Moreover, the support structure 300 may reduce the need for a temporary formwork while still allowing the use of low-cost additive materials and reinforcements. The automated manufacturing process used to fabricate the support structure 300 increases construction speed and further reduces costs using a smaller work crew than conventional methods. Such increased fabrication speed and reduced costs is facilitated by manufacturing near-site or on-site, thereby reducing the transportation costs associated with large structures or sections (e.g., over roads, rail or shipping). Compared to steel structures, the 3DCP methods described herein eliminate the need for expensive and slow welding processes, weld inspection, and surface finishing such as primers and paints. Furthermore, the additive materials (e.g., the printable materials and the castable materials) used by the 3DCP methods are typically lower in cost than steel structures on a per mass basis.

According to an illustrative embodiment, a support structure includes a foundation, which in many embodiments, has at least three legs extending radially outward from a central portion. The support structure may be adapted for offshore applications and the foundation may be configured to anchor to an underwater floor. However, other applications (e.g., land-based applications) and configurations for the foundation are possible (e.g., a monolithic base with no arms). The support structure also includes a substructure coupled to the foundation and configured to couple to another body or surface. For example, the substructure may be configured to couple to an energy-generating device, such as a wind turbine. In another example, the substructure may be configured to couple to a bridge or an overpass. One or both the foundation and the substructure are defined, at least in part, by a plurality of modular sections. At least one of the plurality of modular sections includes a wall disposed along a perimeter to bound a volume, and castable material in a hardened state that fills the volume. In some instances, the at least one modular section is constructed using a 3DCP casting process. In some instances, the wall is formed by contacting layers of printable material successively on top of each other.

For the at least one modular section, the wall may be an outer wall or an inner wall. The at least one modular section may also include other types of walls or mechanical elements (e.g., a truss). For example, the wall may be an outer wall and the perimeter an outer perimeter. In this example, the at least one modular section may further include an inner wall disposed along an inner perimeter contained by the outer perimeter, and the volume associated with the at least one modular section is bounded by the inner and outer walls. In another example, the wall may be an inner wall and the perimeter an inner perimeter. The at least one modular section may further include an outer surface defining an outer perimeter, the outer perimeter containing the inner perimeter, and the volume associated with the at least one modular section bounded by the inner wall and the outer surface.

The plurality of modular sections may be configured to define various types of arrangements when assembled. In some implementations, the plurality of modular sections, when assembled, is stacked such that the plurality of modular sections extends upwards from a bottom-most modular section to a top-most modular section. Such an extension may be a vertical extension. In some implementations, the plurality of modular sections, when assembled, is nested such that the plurality of modular sections extends outwards from an inner-most modular section to an outer-most modular section. Such an extension may be a horizontal extension (e.g., such as along a horizontal plane). However, other types of nested arrangements are possible.

In some implementations, at least one instance of the at least one modular section is configured as a post-tensioned modular section having a post-tensioned device disposed therein. Such disposal may occur in a printable material or the castable material before hardening (i.e., bonded thereto), through a hole, channel, or guide element in the unfilled modular section, or both. The post-tensioned modular section is joined to one or more other modular sections of the plurality of modular sections using the post-tensioned device, which may serve to pre-stress the plurality of modular sections (e.g., part or all of the foundation, the substructure, or both).

In some implementations, one or both of the foundation and the substructure include a pocket (or external cavity) configured to hold ballast material. The pocket may have an externally-accessible opening. In some implementations, one or both of the foundation and the substructure include a hole or gap configured to guide water or air through the support structure. The hole or gap may be within a single modular section or extend through multiple modular sections. The foundation, the substructure, or both, may also include multiple instances of such holes or gaps. The holes or gaps may be operable to reduce a fluidic drag (e.g., to water, air, or both) of the support structure when deployed. In some implementations, the plurality of modular sections includes at least two modular sections configured to selectively join and unjoin from each other. Such capability may allow the support structure to be disassembled after installation, such as for maintenance, repair, and so forth.

The support structure may be configured for offshore deployment, including transportation over (or through) a body of water to an offshore location. To support such deployment, the support structure may include the energy-generating device (e.g., an offshore wind turbine) and the substructure may be coupled to the energy-generating device. In some implementations, the substructure includes a tower structure configured to support the energy-generating device (e.g., an offshore wind turbine).

In some implementations, at least one leg of the foundation includes a suction pile. In some implementations, a central portion of the foundation includes a suction pile. In some implementations, one or both of the foundation and the substructure include an internal chamber configured to control a buoyancy of the support structure. The internal chamber may be configured to be selectively filled or unfilled with a fluid, such as with air or water from a body of water. In some implementations, the foundation is configured to contact an underwater floor. In these implementations, the substructure is directly coupled to the foundation. In other implementations, the foundation is configured to contact the underwater floor, but the substructure is configured to couple to the foundation through one or more mooring lines. In such a configuration, the substructure of the support structure may float above the foundations. The substructure may be partially or fully submerged.

According to an illustrative embodiment, a support structure includes a foundation, which in many embodiments, has at least three legs extending radially outward from a central portion. The support structure may be adapted for offshore applications and the foundation may be configured to anchor to an underwater floor. However, other applications (e.g., land-based applications) and configurations for the foundation are possible (e.g., a monolithic base with no arms). The support structure also includes a substructure coupled to the foundation and configured to couple to another body or surface. For example, the substructure may be configured to couple to an energy-generating device, such as a wind turbine. In another example, the substructure may be configured to couple to a bridge or an overpass. One or both the foundation and the substructure are defined, at least in part, by a plurality of modular sections. At least one of the plurality of modular sections includes an unfilled modular section having one or both of a wall and a truss, and an optional filled modular section having a wall disposed along a perimeter to bound a volume and castable material in a hardened state that fills the volume. In some instances, the unfilled modular section is constructed using a 3DCP process, and the optional filled modular section is constructed using a 3DCP casting process. Additional features of the support structure are described below and in relation to Examples 73-89.

In some implementations, the wall, the truss, or both, of the unfilled modular section are formed by contacting layers of printable material successively on top of each other. In some implementations, the wall of the optional filled modular section is formed by contacting layers of printable material successively on top of each other.

Figure 4:
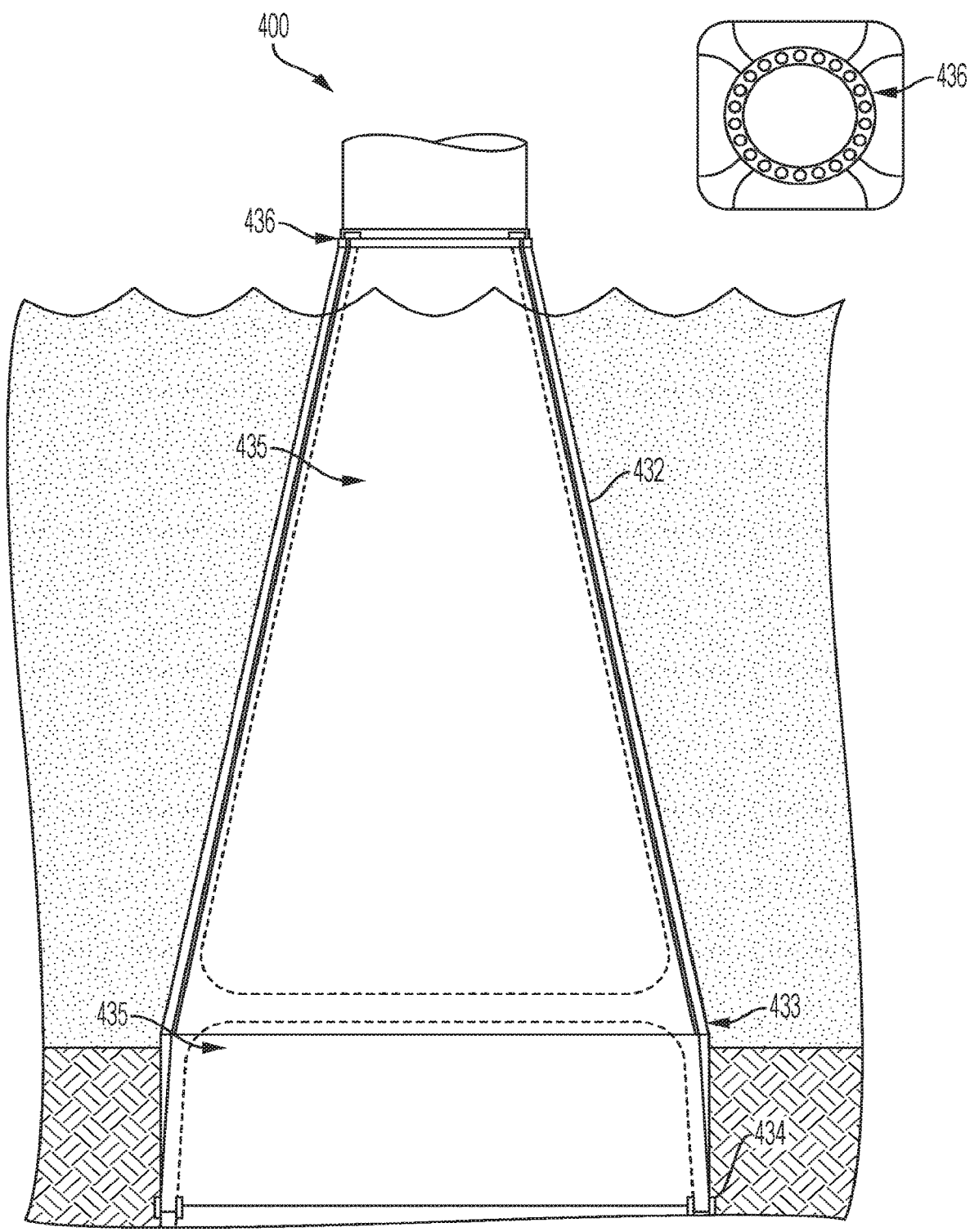
FIG. 4 is an example tower, substructure, and foundation system that includes a substructure section, a foundation section, an anchoring system, buoyancy cavities, and a tower interface.

In some implementations, the unfilled modular section has a post-tensioned device disposed therein. The unfilled modular section is joined to one or more other modular sections of the plurality of modular sections using the post-tensioned device. In some implementations, the optional filled modular section has a post-tensioned device disposed therein. The optional filled modular section is joined to one or more other modular sections of the plurality of modular sections using the post-tensioned device Now referring to FIG. 4, an example tower, substructure, and foundation system 400 is presented that includes a substructure section 432, a foundation section 433, an anchoring system 434, cavities 435, and a tower interface 436. The system 400 differs from the tower and foundation system 300 of FIG. 3 by lacking arms and having only one-suction pile (referred to as a mono-bucket). These features may allow the system 400 to have a smaller diameter and potentially less mass. The foundation section 433 includes a suction pile, which may be a cylindrical shape, but can also take other shapes such as a hexagonal shape or a square shape. The suction pile can be integrated into the substructure section 432, or alternatively, fastened to the substructure section 432 using bolts or tensioning cables extending through the substructure and foundation walls, or within the tower and foundation interior. The suction pile can be made from cementitious materials, ceramic materials, or metallic materials. A thin knife edge or surface 434 made from steel other materials can be added to the bottom of the suction pile to facilitate penetration of the seafloor, especially for thick walled suction piles that may be made from concrete. The cavities 435 are volumes that can serve the purposes of reducing the mass of the structure, for providing buoyancy by displacing water with a less dense material such as air or foam, or for adding ballast materials to the system 300.

Figure 5A:
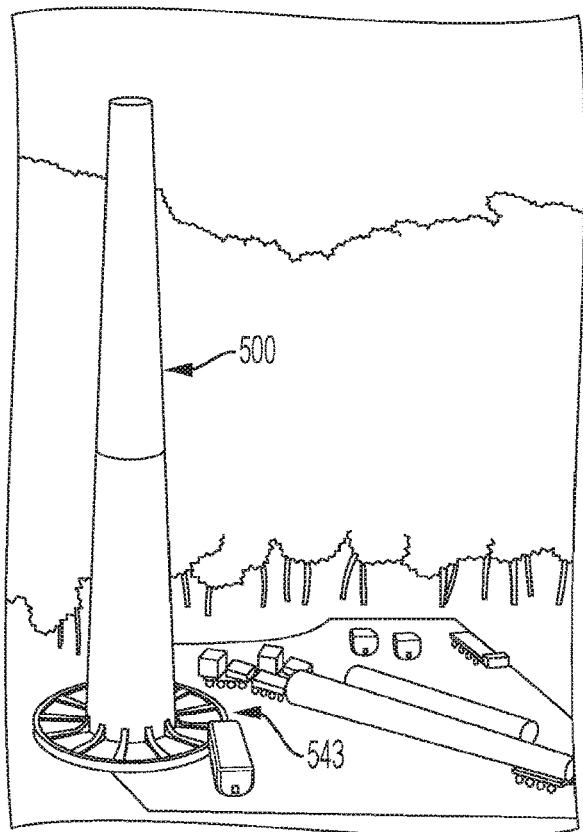
FIG. 5A is an example tower, substructure, and foundation structure system anchored on land that has a foundation section with filled external cavities.
Figure 5B:
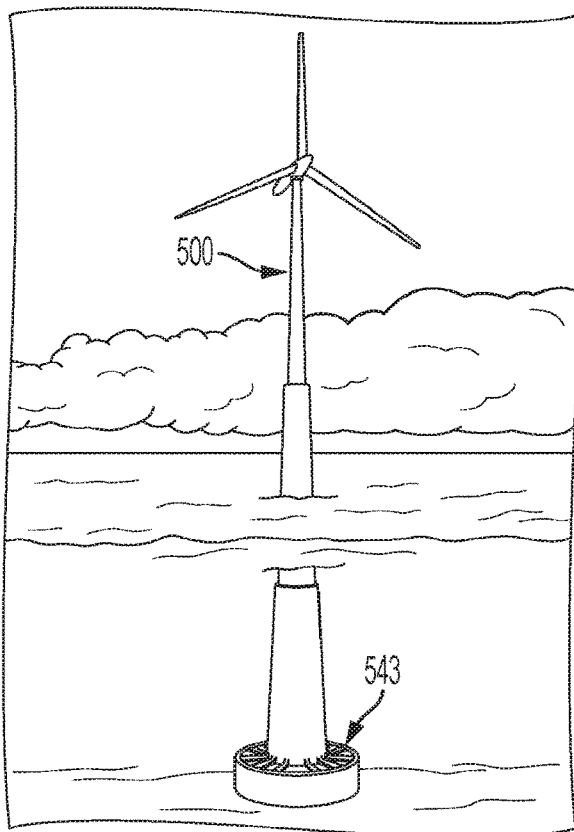
FIG. 5B is an example tower, substructure, and foundation structure system anchored on a seafloor that has a foundation section with filled external cavities.

Now referring to FIGS. 5A & 5B, an example tower, substructure, and foundation structure system 500 is presented in which a foundation section 543 contains external cavities filled with sand, iron ore, recycled concrete or other materials. FIG. 5A presents one variant of the system 500 anchored on land. FIG. 5B presents another variant of the system 500 anchored on a seafloor. The filled external cavities may replace a suction pile to provide the required weight to resist overturning of the structure from wind or water loads, or work in conjunction with a suction pile to provide additional resistance to overturning forces.

Figure 6A:
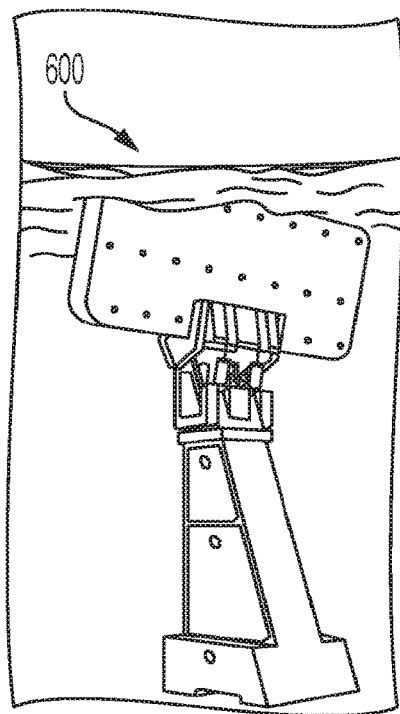
FIG. 6A is an example tower, substructure, and foundation disposed in a marine environment and manufactured horizontally in sections for wind turbine or water-powered applications.
Figure 6B:
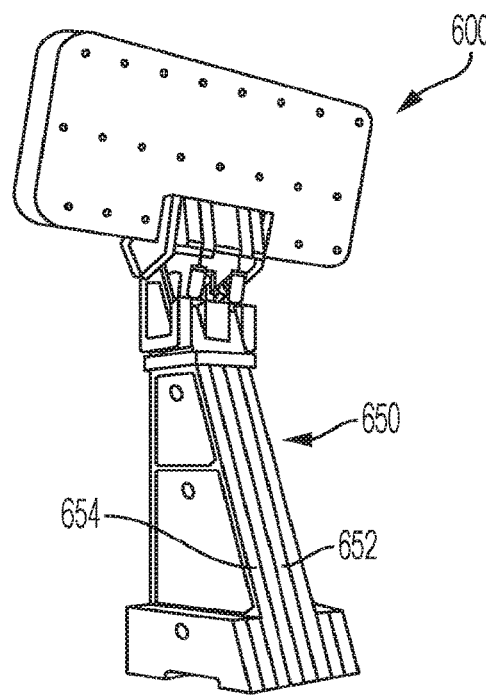
FIG. 6B is the example tower, substructure, and foundation of FIG. 6A outside of the marine environment.
Figure 6C:
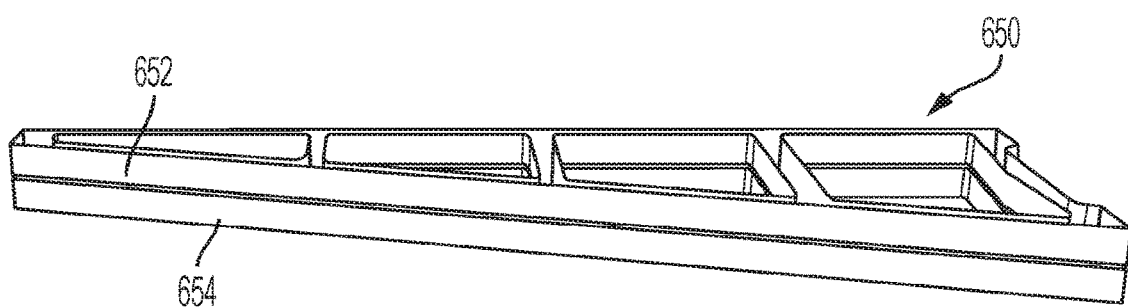
FIG. 6C is an example mid-section, shown in cross-section, of the example tower, substructure, and foundation of FIGS. 6A & 6B.

Now referring to FIGS. 6A-6B, an example tower, substructure, and foundation 600 is presented that is manufactured horizontally in sections for wind turbine or water-power applications using 3DCP, 3DCP-casting methods, or other manufacturing methods. In other variations, the tower, substructure, and foundation 600 can be manufactured vertically. FIG. 6A presents the example tower, substructure, and foundation 600 as installed in a marine environment and anchored on a seafloor. FIG. 6C presents an example midsection 650, shown in cross-section, of the example tower, substructure, and foundation of FIGS. 6A & 6B.

The tower sections may be manufactured with the tower positioned vertically, and the 3D-cast sections 652, 654 being manufactured horizontally similar to the system 300 of FIG. 3. In the example shown, an integrated primary central tower/substructure/foundation support member (hereinafter as "tower") is built-up with the tower positioned horizontally in 4 sections, each 2-m tall. The tower's inner and outer surface profiles and interior features such as cavities are printed in successive layers up to approximately 2 inches tall. If necessary, conventional reinforcements (such as fiberglass, basalt, or steel rebar or fibers) can be positioned between the inner and outer surfaces in each section after the section height reaches approximately one to three meters, and before additional cast materials are added to the section. After the walls strengthen, cementitious, ceramic, or other additive materials—optionally mixed with reinforcing fibers—are poured into the volume between the inner and outer surfaces. In some variations, reinforcement can be achieved (or enhanced) using Engineered Cementitious Composite (ECC) concrete and post-tensioning across the layers and sections to withstand the loads on the tower potentially eliminating the need for manual rebar placement. The ECC concrete may include mortar-based composites reinforced with specially selected short random fibers such as steel, polymer, or organic fibers. After the cast materials strengthen, the inner and outer surfaces for the next 3DCP-cast section can be printed on the previous section. The section-on-section construction process may be similar to the conventional concrete construction process, which for bridges and some concrete wind turbine towers, is called match-casting. 3DCP match-casting eliminates the need for expensive mortar or machining operations between layers by printing new sections on top of lower sections. After printing, the 3DCP components cure for a period of up to 4 weeks depending on the materials. Additional 3DCP components such as the tower "feet", the removable upper tower section, and the flap can then be attached to the structure using post tensioning rods, tendons or fasteners.

The tower and foundation components for an offshore support structure may be designed to be manufactured and assembled horizontally on the dock, or in a dry dock. A variety of methods can be used to move the assembled support structure from a dock to the water such as a crane or marine travel lift and boat launch. The flexibility of 3DCP manufacturing allows integrated buoyancy chambers to be incorporated into the support structure or tower to enable the fully assembled support structure to be floated horizontally to the installation site using inexpensive, readily available tugs. After reaching the installation site, the buoyancy chambers may be flooded to submerge and rotate the system 600 vertically in a controlled fashion. The system 600 buoyancy chambers may be filled with dredged materials such as sand, or regionally available materials like iron ore or recycled crushed concrete to provide ballast to resist overturning forces.

In some implementations, a method of manufacturing a support structure, such as a wind turbine, includes constructing a plurality of modular sections that assemble to define the support structure. At least one of the plurality of modular sections is constructed using an additive manufacturing process. The additive manufacturing process may correspond to a 3DCP casting or a 3DCP process. Other additive manufacturing processes are possible. The method also includes joining the plurality of modular sections to assemble the support structure. The support structure may include one or more modular sections configured to couple to another body or surface. For example, if the support structure is adapted for offshore wind turbines, the one or more modular sections may be configured to anchor to an underwater floor (e.g., a seabed, a lake bed, a river bed, etc.). Similarly, if the support structure is adapted for land-based wind turbines, the one or more modular sections may be configured to anchor to ground (e.g., underground bedrock, a pre-cast cement slab, etc.). Other types of energy-generating devices are possible as well as other deployment locations for the support structure. Additional operations and features of the method are described below and in relation to Examples 38-51.

In some implementations, the plurality of modular sections includes a first modular section and a second modular section. The second modular section is constructed after the first modular section and serves as part of the at least one modular section constructed by the additive manufacturing process. In these implementations, joining the plurality of modular sections includes additively manufacturing the second modular section on a surface of the first modular section. In some variations, the first modular section may be part of the at least one modular section and also constructed by the additive manufacturing process. However, in other variations, the first modular section is formed through other types of operations (e.g., a conventional construction process). In some instances, the first and second modular sections are identical in shape and size. In some instances, the first and second modular sections are similar in shape but different in size (e.g., scaled). In some instances, the first and second modular sections are different in shape and size.

In some aspects of what is described, a support structure may be manufactured as described by the following examples:

Example 1. A method of manufacturing a support structure for offshore wind turbines, the method comprising:
constructing a plurality of modular sections that assemble to define the support structure, at least one modular section constructed by operations that comprise:
forming a wall along a perimeter to bound a volume, filling the volume with a castable material, and hardening the castable material; and
joining the plurality of modular sections to assemble the support structure;
wherein one or more modular sections are configured to anchor to an underwater floor.

Example 2. The method of example 1, wherein forming the wall comprises depositing layers of printable material successively on top of each other.

Example 3. The method of example 2, wherein forming the wall comprises hardening the layers of printable material.

Example 4. The method of example 1 or any one of examples 2-3,
wherein the plurality of modular sections comprises a first modular section and a second modular section, the second modular section constructed after the first modular section;
wherein the at least one modular section comprises the second modular section; and
wherein joining the plurality of modular sections comprises:
forming the wall of the second modular section on a surface of the first modular section, the wall of the second modular section and the surface of the first modular section bounding the volume of the second modular section; and
filling the volume of the second modular section with a castable material, the castable material contacting the surface of the first modular section when the volume of the second modular section is filled.

Example 5. The method of example 4, wherein the at least one modular section comprises the first modular section.

Example 6. The method of example 1 or any one of examples 2-5, wherein the wall is an inner wall and the perimeter is an inner perimeter.

Example 7. The method of example 6, wherein the operations comprise:
disposing a removable wall along an outer perimeter that contains the inner perimeter, the volume bounded by the inner and removable walls; and
after hardening the castable material, removing the removable wall.

Example 8. The method of example 1 or any one of examples 2-5, wherein the wall is an outer wall and the perimeter is an outer perimeter.

Example 9. The method of example 8, wherein the operations comprise forming an inner wall along an inner perimeter contained by the outer perimeter, the volume bounded by the inner and outer walls.

Example 10. The method of example 1 or any one of examples 2-9, wherein the plurality of modular sections comprises at least two modular sections configured to selectively join and unjoin from each other.

Example 11. The method of example 10, comprising unjoining the plurality of modular sections to disassemble the support structure.

Example 12. The method of example 1 or any one of examples 2-11,
wherein at least one instance of the at least one modular section is constructed as a post-tensioned modular section;
wherein, for the post-tensioned modular section, the operations comprise one or both of:
disposing a post-tensioning device in the wall of the post-tensioned modular section during formation, and
disposing a post-tensioning device in the castable material of the post-tensioned modular section; and
wherein joining the plurality of modular sections comprises using the disposed post-tensioned devices to join the post-tensioned modular section to one or more other modular sections of the plurality of modular sections.

Example 13. The method of example 1 or any one of examples 2-12, wherein the at least one modular section, when constructed, comprises a cavity that defines at least part of a buoyancy chamber of the support structure.

Example 14. The method of example 1 or any one of examples 2-13, wherein the plurality of modular sections, when assembled, defines a hole or gap configured to guide water or air through the support structure.

Example 15. The method of example 1 or any one of examples 2-14, wherein the one or more modular sections are configured to contact the underwater floor when anchored thereto.

Example 16. The method of example 1 or any one of examples 2-15, wherein the one or more modular sections are configured to tether to a submerged structure when anchored to the underwater floor, the submerged structure in contact with the underwater floor when deployed.

Example 17. The method of example 1 or any one of examples 2-16, wherein joining the plurality of modular sections comprises arranging the plurality of modular sections into a stacked assembly in which the plurality of modular sections extends upwards from a bottom-most modular section to a top-most modular section.

Example 18. The method of example 1 or any one of examples 2-16, wherein joining the plurality of modular sections comprises arranging the plurality of modular sections into a nested assembly in which the plurality of modular sections extends outwards from an inner-most modular section to an outer-most modular section.

In some aspects of what is described, a support structure may include features as described by the following examples:

Example 19. A support structure for offshore wind turbines, the support structure comprising:
a foundation configured to anchor to an underwater floor and having at least three legs extending radially outward from a central portion; and
a substructure coupled to the foundation and configured to couple to a wind turbine;
wherein one or both the foundation and the substructure are defined, at least in part, by a plurality of modular sections, at least one modular section comprising:
a wall disposed along a perimeter to bound a volume, and
castable material in a hardened state that fills the volume.

Example 20. The support structure of example 19, wherein the wall is formed by contacting layers of printable material successively on top of each other.

Example 21. The support structure of example 19 or example 20, wherein the wall is an outer wall and the perimeter is an outer perimeter.

Example 22. The support structure of example 21, wherein the at least one modular section comprises an inner wall disposed along an inner perimeter contained by the outer perimeter, the volume bounded by the inner and outer walls.

Example 23. The support structure of example 19 or example 20, wherein the wall is an inner wall and the perimeter is an inner perimeter.

Example 24. The support structure of example 23, wherein the at least one modular section comprises an outer surface defining an outer perimeter, the outer perimeter containing the inner perimeter, the volume bounded by the inner wall and the outer surface.

Example 25. The support structure of example 19 or any one of examples 20-24, wherein at least one leg of the foundation comprises a suction pile.

Example 26. The support structure of example 19 or any one of examples 20-25, wherein one or both of the foundation and the substructure comprise a pocket configured to hold ballast material, the pocket having an externally-accessible opening.

Example 27. The support structure of example 19 or any one of examples 20-26, wherein one or both of the foundation and the substructure comprise an internal chamber configured to control a buoyancy of the support structure.

Example 28. The support structure of example 27, wherein the internal chamber is further configured to be selectively filled or unfilled with a fluid.

Example 29. The support structure of example 19 or any one of examples 20-28, wherein one or both of the foundation and the substructure comprise a hole or gap configured to guide water or air through the support structure.

Example 30. The support structure of example 19 or any one of examples 20-29,
 wherein the foundation is configured to contact the underwater floor; and
 wherein the substructure is directly coupled to the foundation.

Example 31. The support structure of example 19 or any one of examples 20-29, wherein the foundation is configured to contact the underwater floor; and wherein the substructure is configured to couple to the foundation through one or more mooring lines.

Example 32. The support structure of example 19 or any one of examples 20-31, wherein the plurality of modular sections comprises at least two modular sections configured to selectively join and unjoin from each other.

Example 33. The support structure of example 19 or any one of examples 20-32,
 wherein at least one instance of the at least one modular section is configured as a post-tensioned modular section having a post-tensioned device disposed therein; and
 wherein the post-tensioned modular section is joined to one or more other modular sections of the plurality of modular sections using the post-tensioned device.

Example 34. The support structure of example 19 or any one of examples 20-33, wherein the plurality of modular sections, when assembled, is stacked such that the plurality of modular sections extends upwards from a bottom-most modular section to a top-most modular section.

Example 35. The support structure of example 19 or any one of examples 20-33, wherein the plurality of modular sections, when assembled, is nested such that the plurality of modular sections extends outwards from an inner-most modular section to an outer-most modular section.

Example 36. The support structure of example 19 or any one of examples 20-35, wherein the support structure comprises the offshore wind turbine and the substructure is coupled to the offshore wind turbine.

Example 37. The support structure of example 19 or any one of examples 20-36, wherein the substructure comprises a tower structure configured to support the offshore wind turbine.

In some aspects of what is described, a support structure may be manufactured as described by the following examples:

Example 38. A method of manufacturing a support structure for offshore wind turbines, the method comprising:
 constructing a plurality of modular sections that assemble to define the support structure, at least one modular section constructed using an additive manufacturing process; and
 joining the plurality of modular sections to assemble the support structure;
 wherein one or more modular sections configured to anchor to an underwater floor.

Example 39. The method of example 38,
 wherein the plurality of modular sections comprises a first modular section and a second modular section, the second modular section constructed after the first modular section;
 wherein the at least one modular section comprises the second modular section; and
 wherein joining the plurality of modular sections comprises additively manufacturing the second modular section on a surface of the first modular section.

Example 40. The method of example 39, wherein the at least one modular section comprises the first modular section.

Example 41. The method of example 38 or any one of examples 39-40, wherein the plurality of modular sections comprises at least two modular sections configured to selectively join and unjoin from each other.

Example 42. The method of example 41, comprising unjoining the plurality of modular sections to disassemble the support structure.

Example 43. The method of example 38 or any one of examples 39-42,
 wherein at least one instance of the at least one modular section is constructed as a post-tensioned modular section;
 wherein, for the post-tensioned modular section, the additive manufacturing process comprises disposing a post-tensioning device in the post-tensioned modular section; and
 wherein joining the plurality of modular sections comprises using the post-tensioned device to join the post-tensioned modular section to one or more other modular sections of the plurality of modular sections.

Example 44. The method of example 38 or any one of examples 39-43, wherein the at least one modular section, when constructed, comprises a cavity that defines at least part of a buoyancy chamber of the support structure.

Example 45. The method of example 38 or any one of examples 39-44, wherein the at least one modular section, when constructed, comprises a suction pile.

Example 46. The method of example 38 or any one of examples 39-45, wherein the at least one modular section, when constructed, comprises a pocket configured to hold ballast material, the pocket having an externally-accessible opening.

Example 47. The method of example 38 or any one of examples 39-46, wherein the plurality of modular sections, when assembled, defines a hole or gap configured to guide water or air through the support structure.

Example 48. The method of example 38 or any one of examples 39-47, wherein the at least one modular section is configured to contact the underwater floor when anchored thereto.

Example 49. The method of example 38 or any one of examples 39-47, wherein the at least one modular section is configured to tether to a submerged structure when anchored to the underwater floor, the submerged structure in contact with the underwater floor when deployed.

Example 50. The method of example 38 or any one of examples 39-49, wherein joining the plurality of modular sections comprises arranging the plurality of modular sections into a stacked assembly in which the plurality of modular sections extends upwards from a bottom-most modular section to a top-most modular section.

Example 51. The method of example 38 or any one of examples 39-49, wherein joining the plurality of modular sections comprises arranging the plurality of modular sections into a nested assembly in which the plurality of modular sections extends outwards from an inner-most modular section to an outer-most modular section.

In some aspects of what is described, a support structure may be manufactured as described by the following examples:

Example 52. A method of manufacturing a support structure for offshore wind turbines, the method comprising:
constructing a plurality of modular sections that assemble to define the support structure, the plurality of modular sections comprising:
an unfilled modular section constructed by first operations comprising:
forming a wall or a truss, and
an optional filled modular section constructed by second operations comprising:
forming a wall along a perimeter to bound a volume, filling the volume with a castable material, and hardening the castable material; and
joining the plurality of modular sections to assemble the support structure;
wherein one or more modular sections are configured to anchor to an underwater floor.

Example 53. The method of example 52, wherein forming the wall or truss, forming the wall along the perimeter, or both, comprise depositing layers of printable material successively on top of each other.

Example 54. The method of example 53, wherein forming the wall or truss, forming the wall along the perimeter, or both, comprise hardening the layers of printable material.

Example 55 the method of example 52 or any one of examples 53-54, wherein the wall formed along the perimeter is an inner wall and the perimeter is an inner perimeter.

Example 56. The method of example 55, wherein the second operations comprise:
disposing a removable wall along an outer perimeter that contains the inner perimeter, the volume bounded by the inner and removable walls; and
after hardening the castable material, removing the removable wall.

Example 57. The method of example 52 or any one of examples 53-54, wherein the wall formed along the perimeter is an outer wall and the perimeter is an outer perimeter.

Example 58. The method of example 57, wherein the second operations comprise forming an inner wall along an inner perimeter contained by the outer perimeter, the volume bounded by the inner and outer walls.

Example 59. The method of example 52 or any one of examples 53-58,
wherein the plurality of modular sections comprises a first modular section and a second modular section, the second modular section constructed after the first modular section;
wherein the second modular section corresponds to the unfilled modular section; and
wherein joining the plurality of modular sections comprises forming the wall or the truss on a surface of the first modular section.

Example 60. The method of example 59, wherein the first modular section corresponds to the optional filled modular section.

Example 61. The method of example 52 or any one of examples 53-58,
wherein the plurality of modular sections comprises a first modular section and a second modular section, the second modular section constructed after the first modular section;
wherein the second modular section corresponds to the optional filled modular section; and
wherein joining the plurality of modular sections comprises:
forming the wall of the second modular section on a surface of the first modular section, the wall of the second modular section and the surface of the first modular section bounding the volume of the second modular section; and
filling the volume of the second modular section with a castable material, the castable material contacting the surface of the first modular section when the volume of the second modular section is filled.

Example 62. The method of example 61, wherein the first modular section corresponds to the unfilled modular section.

Example 63. The method of example 52 or any one of examples 53-62, wherein the plurality of modular sections comprises at least two modular sections configured to selectively join and unjoin from each other.

Example 64. The method of example 63, comprising unjoining the plurality of modular sections to disassemble the support structure.

Example 65. The method of example 52 or any one of examples 53-64,
wherein the first operations comprise disposing a post-tensioning device in the wall, the truss, or both, of the unfilled modular section during formation; and
wherein joining the plurality of modular sections comprises using the post-tensioned device to join the unfilled modular section to one or more other modular sections of the plurality of modular sections.

Example 66. The method of example 52 or any one of examples 53-65,
wherein the second operations comprise:
disposing a post-tensioning device in the wall of the optional filled modular section during formation, and
disposing a post-tensioning device in the castable material of the optional filled modular section; and
wherein joining the plurality of modular sections comprises using the disposed post-tensioned devices to join the optional filled modular section to one or more other modular sections of the plurality of modular sections.

Example 67. The method of example 52 or any one of examples 53-66, wherein the unfilled modular section, the optional filled modular section, or both, when constructed, comprise a cavity that defines at least part of a buoyancy chamber of the support structure.

Example 68. The method of example 52 or any one of examples 53-67, wherein the plurality of modular sections, when assembled, defines a hole or gap configured to guide water or air through the support structure.

Example 69. The method of example 52 or any one of examples 53-68, wherein the one or more modular sections are configured to contact the underwater floor when anchored thereto.

Example 70. The method of example 52 or any one of examples 53-68, wherein the one or more modular sections are configured to tether to a submerged structure when anchored to the underwater floor, the submerged structure in contact with the underwater floor when deployed.

Example 71. The method of example 52 or any one of examples 53-70, wherein joining the plurality of modular sections comprises arranging the plurality of modular sections into a stacked assembly in which the plurality of modular sections extends upwards from a bottom-most modular section to a top-most modular section.

Example 72. The method of example 52 or any one of examples 53-70, wherein joining the plurality of modular sections comprises arranging the plurality of modular sections into a nested assembly in which the plurality of modular sections extends outwards from an inner-most modular section to an outer-most modular section.

In some aspects of what is described, a support structure may include features as described by the following examples:

Example 73. A support structure for offshore wind turbines, the support structure comprising:
  a foundation configured to anchor to an underwater floor and having at least three legs extending radially outward from a central portion; and
  a substructure coupled to the foundation and configured to couple to a wind turbine;
  wherein one or both the foundation and the substructure are defined, at least in part, by a plurality of modular sections, the plurality of modular sections comprising:
    an unfilled modular section comprising one or both of a wall and a truss, and
    an optional filled modular section comprising:
      a wall disposed along a perimeter to bound a volume, and
      castable material in a hardened state that fills the volume.

Example 74. The support structure of example 73, wherein the wall, the truss, or both, of the unfilled modular section are formed by contacting layers of printable material successively on top of each other.

Example 75. The support structure of example 73 or example 74, wherein the wall of the optional filled modular section is formed by contacting layers of printable material successively on top of each other.

Example 76. The support structure of example 73 or any one of examples 74-75, wherein at least one leg of the foundation comprises a suction pile.

Example 77. The support structure of example 73 or any one of examples 74-76, wherein one or both of the foundation and the substructure comprise a pocket configured to hold ballast material, the pocket having an externally-accessible opening.

Example 78. The support structure of example 73 or any one of examples 74-76, wherein one or both of the foundation and the substructure comprise an internal chamber configured to control a buoyancy of the support structure.

Example 79. The support structure of example 78, wherein the internal chamber is further configured to be selectively filled or unfilled with a fluid.

Example 80. The support structure of example 73 or any one of examples 74-79, wherein one or both of the foundation and the substructure comprise a hole or gap configured to guide water or air through the support structure.

Example 81. The support structure of example 73 or any one of examples 74-80, wherein the foundation is configured to contact the underwater floor; and wherein the substructure is directly coupled to the foundation.

Example 82. The support structure of example 65 or any one of examples 74-80, wherein the foundation is configured to contact the underwater floor; and wherein the substructure is configured to couple to the foundation through one or more mooring lines.

Example 83. The support structure of example 73 or any one of examples 74-82, wherein the plurality of modular sections comprises at least two modular sections configured to selectively join and unjoin from each other.

Example 84. The support structure of example 73 or any one of examples 74-83,
  wherein the unfilled modular section has a post-tensioned device disposed therein; and
  wherein the unfilled modular section is joined to one or more other modular sections of the plurality of modular sections using the post-tensioned device.

Example 85. The support structure of example 73 or any one of examples 74-84,
  wherein the optional filled modular section has a post-tensioned device disposed therein; and
  wherein the optional filled modular section is joined to one or more other modular sections of the plurality of modular sections using the post-tensioned device.

Example 86. The support structure of example 73 or any one of examples 74-85, wherein the plurality of modular sections, when assembled, is stacked such that the plurality of modular sections extends upwards from a bottom-most modular section to a top-most modular section.

Example 87. The support structure of example 73 or any one of examples 74-85, wherein the plurality of modular sections, when assembled, is nested such that the plurality of modular sections extends outwards from an inner-most modular section to an outer-most modular section.

Example 88. The support structure of example 73 or any one of examples 74-87, wherein the support structure comprises the offshore wind turbine and the substructure is coupled to the offshore wind turbine.

Example 89. The support structure of example 73 or any one of examples 74-88, wherein the substructure comprises a tower structure configured to support the offshore wind turbine.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method of manufacturing a support structure for wind turbines, the method comprising:
   constructing a plurality of modular sections that assemble to define the support structure, at least one modular section having a body constructed by an additive manufacturing process comprising:
      depositing layers of printable material successively on top of each other to form the body, and
      hardening the deposited layers of printable material; and
   joining the plurality of modular sections to assemble the support structure;
   wherein one or more of the plurality of modular sections are configured to anchor to ground or an underwater floor;
   wherein the plurality of modular sections comprises a first modular section having a first body and a second modular section having a second body, the second modular section constructed after the first modular section;
   wherein the at least one modular section comprises the second modular section; and
   wherein joining the plurality of modular sections comprises:
      depositing second layers of printable material successively on top of each other to form the second body, at least one of the second layers contacting a surface of the first body; and
      hardening the second deposited layers of printable material.

2. The method of claim 1, wherein the printable material comprises a cementitious material.

3. The method of claim 1, wherein the body comprises a wall.

4. The method of claim 1, wherein the body comprises a truss.

5. The method of claim 1, wherein the at least one modular section comprises the first modular section.

6. The method of claim 1, wherein the plurality of modular sections comprises at least two modular sections configured to selectively join and unjoin from each other.

7. The method of claim 1,
   wherein one or more instances of the at least one modular section are constructed as a post-tensioned modular section;
   wherein, for the post-tensioned modular section, the operations comprise disposing a post-tensioning device in the post-tensioned modular section; and
   wherein joining the plurality of modular sections comprises using the post-tensioned device to join the post-tensioned modular section to one or more other modular sections of the plurality of modular sections.

8. The method of claim 1, wherein joining the plurality of modular sections comprises arranging the plurality of modular sections into a stacked assembly in which the plurality of modular sections extends upwards from a bottom-most modular section to a top-most modular section.

9. The method of claim 1, wherein joining the plurality of modular sections comprises arranging the plurality of modular sections into a nested assembly in which the plurality of modular sections extends outwards from an inner-most modular section to an outer-most modular section.

10. The method of claim 1, wherein the at least one modular section, when constructed, comprises a cavity that defines at least part of a buoyancy chamber of the support structure.

11. The method of claim 1, wherein the at least one modular section, when constructed, comprises a suction pile.

12. The method of claim 1, wherein the at least one modular section, when constructed, comprises a doorway.

13. The method of claim 1, wherein the plurality of modular sections are constructed on a dock or in a dry dock.

14. The method of claim 1, wherein the plurality of modular sections are joined on a dock or in a dry dock.

* * * * *